US012682698B2

(12) United States Patent
Turner et al.

(10) Patent No.: US 12,682,698 B2
(45) Date of Patent: Jul. 14, 2026

(54) SYSTEM AND METHOD FOR DIAGNOSING A PARK FUNCTION FOR AN IN-WHEEL ELECTRIC MOTOR

(71) Applicant: Electric Propulsion Technologies, LLC, Farmington Hills, MI (US)

(72) Inventors: Douglas D. Turner, Lombard, IL (US); Kiran Natwerlal Soni, Rochester Hills, MI (US)

(73) Assignee: Electric Propulsion Technologies, LLC

( * ) Notice: Subject to any disclaimer, the term of this patent is extended or adjusted under 35 U.S.C. 154(b) by 233 days.

(21) Appl. No.: 18/204,340

(22) Filed: May 31, 2023

(65) Prior Publication Data

US 2023/0394895 A1 Dec. 7, 2023

Related U.S. Application Data

(60) Provisional application No. 63/348,200, filed on Jun. 2, 2022.

(51) Int. Cl.
*G07C 5/08* (2006.01)
*B60K 7/00* (2006.01)
(Continued)

(52) U.S. Cl.
CPC ....... *G07C 5/0808* (2013.01); *F16H 61/0059* (2013.01); *F16H 61/12* (2013.01); *F16H 61/2807* (2013.01); *F16H 63/3416* (2013.01); *B60K 7/0007* (2013.01); *B60K 17/046* (2013.01); *B60L 2240/486* (2013.01); *B60L 2260/20* (2013.01); *F16H 2061/1204* (2013.01); *F16H 2061/1208* (2013.01);
(Continued)

(58) Field of Classification Search
None
See application file for complete search history.

(56) References Cited

U.S. PATENT DOCUMENTS

| 5,611,245 A | 3/1997 | McKee | |
| 11,883,955 B1 * | 1/2024 | Smith | G05B 19/406 |

(Continued)

FOREIGN PATENT DOCUMENTS

| DE | 102013225519 A1 * | 6/2015 | | B60K 1/00 |

OTHER PUBLICATIONS

English translation of DE-102013225519-A1 (Year: 2015).*

*Primary Examiner* — Faris S Almatrahi
*Assistant Examiner* — Selena M Jin
(74) *Attorney, Agent, or Firm* — Dickinson Wright PLLC

(57) ABSTRACT

A method for diagnosing a park function in a vehicle including a plurality of in-wheel motors each including first and second planetary gear sets includes, at a computing device, selectively engaging each of the first and second planetary gear sets in each of the plurality of in-wheel motors to place each of the in-wheel motors into a park state, engaging respective locking mechanisms of each of the in-wheel motors, when each of the first and second planetary gear sets is engaged and the respective locking mechanisms are engaged, determining whether a corresponding one of the in-wheel motors maintains the park state, and operating the vehicle in a selected one of a plurality of operating modes based on the determination of whether the corresponding one of the in-wheel motors maintained the park state.

19 Claims, 4 Drawing Sheets

(51) Int. Cl.
| | |
|---|---|
| *B60K 17/04* | (2006.01) |
| *F16H 61/00* | (2006.01) |
| *F16H 61/12* | (2010.01) |
| *F16H 61/28* | (2006.01) |
| *F16H 63/34* | (2006.01) |

(52) U.S. Cl.
CPC ............... *F16H 2061/1224* (2013.01); *F16H 2061/1256* (2013.01); *F16H 2061/2853* (2013.01); *F16H 2200/0021* (2013.01); *F16H 2200/0034* (2013.01); *F16H 2200/2007* (2013.01)

(56) References Cited

U.S. PATENT DOCUMENTS

| 2012/0041661 | A1* | 2/2012 | Kaneko | .................. B60T 1/062 |
| | | | | 701/70 |
| 2014/0144718 | A1 | 5/2014 | Mair et al. | |
| 2014/0200114 | A1* | 7/2014 | Dix | ..................... B60W 10/101 |
| | | | | 477/92 |
| 2015/0094925 | A1* | 4/2015 | Senoo | ..................... B60T 1/005 |
| | | | | 701/70 |
| 2015/0175009 | A1 | 6/2015 | Beever et al. | |
| 2015/0219172 | A1* | 8/2015 | Saoyama | ................ F16D 65/54 |
| | | | | 188/162 |
| 2016/0025200 | A1* | 1/2016 | Petersen | ................. B60L 3/106 |
| | | | | 475/204 |
| 2016/0214594 | A1* | 7/2016 | Richey | ................. B60T 17/221 |
| 2018/0043895 | A1* | 2/2018 | Shami | ................. B60W 10/184 |
| 2018/0112774 | A1 | 4/2018 | Littlefield et al. | |
| 2018/0257638 | A1 | 9/2018 | Ortmann et al. | |
| 2019/0211928 | A1 | 7/2019 | Puiu et al. | |
| 2020/0325987 | A1* | 10/2020 | Nishimoto | ............... B60K 5/04 |
| 2022/0032929 | A1 | 2/2022 | Wang et al. | |
| 2022/0034399 | A1* | 2/2022 | Miller | ................ F16H 61/0213 |
| 2022/0105919 | A1* | 4/2022 | Masuda | .................. B60T 7/107 |
| 2022/0153108 | A1 | 5/2022 | Takamatsu | |
| 2023/0296162 | A1* | 9/2023 | Höhn | ..................... F16D 11/04 |
| | | | | 475/149 |
| 2024/0262336 | A1* | 8/2024 | Summers | ................. G01L 5/28 |

* cited by examiner

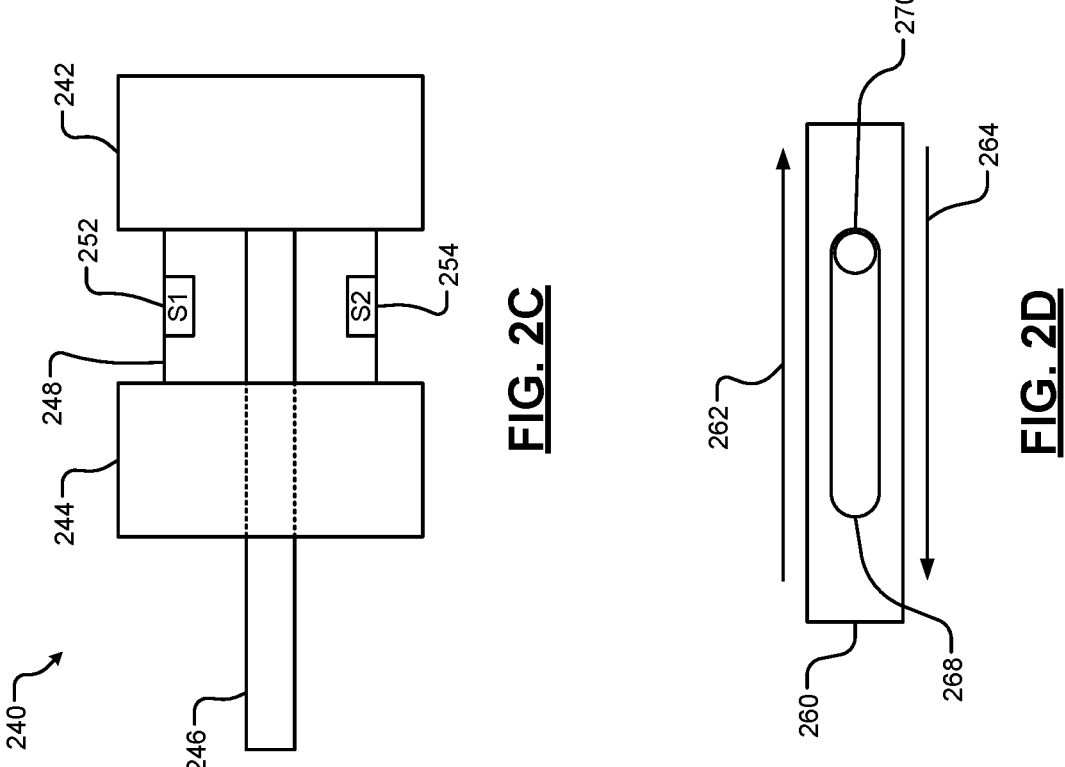
FIG. 2C
FIG. 2D
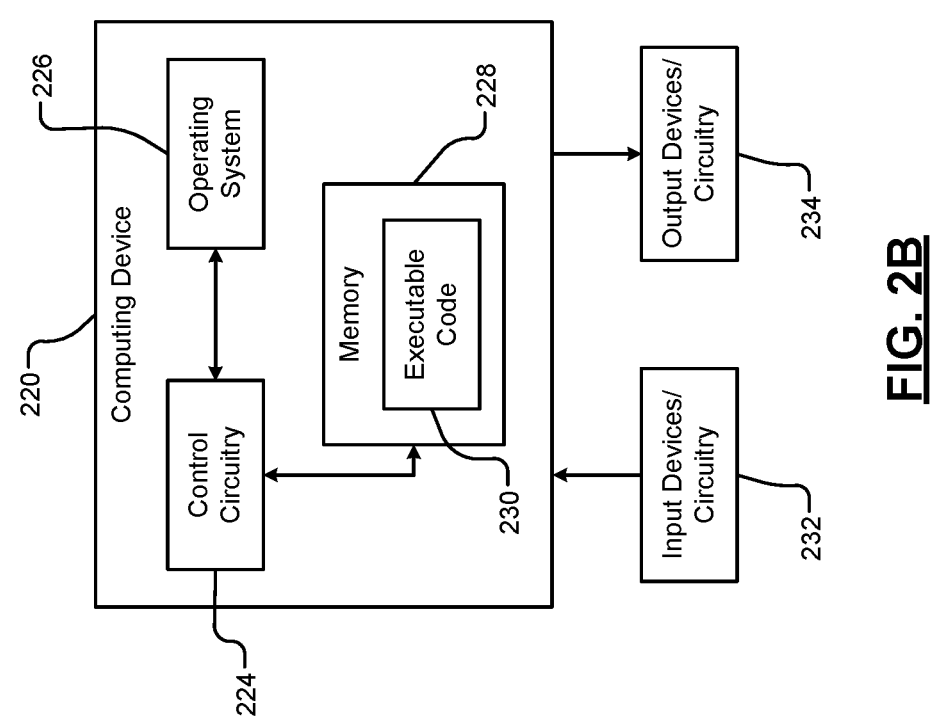
FIG. 2B

SYSTEM AND METHOD FOR DIAGNOSING A PARK FUNCTION FOR AN IN-WHEEL ELECTRIC MOTOR

CROSS-REFERENCE TO RELATED APPLICATIONS

This application claims the benefit of U.S. Provisional Application No. 63/348,200, filed on Jun. 2, 2022. The entire disclosure of the application referenced above is incorporated herein by reference.

FIELD OF THE DISCLOSURE

The present disclosure relates generally to electric devices, such as electric propulsion systems. More specifically, the present disclosure relates to a method of diagnosing a park function for an electric propulsion system of an electric vehicle.

BACKGROUND OF THE INVENTION

This section provides a general summary of background information and the comments and examples provided in this section are not necessarily prior art to the present disclosure.

Various drivelines in automotive, truck, and certain off-highway applications receive power from a central prime mover and distribute the power to at least one wheel using mechanical devices such as transmissions, transaxles, propeller shafts, and live axles. These configurations work well when the prime mover can be bulky or heavy, such as, for example, various internal combustion engines ("ICE") and centralized electric axles.

In accordance with certain automotive standards, specifically FMVSS 114 and ISO26262:2018, a transmission PARK state is required in both traditional ICE and electric motor vehicles. As it relates to FMVSS 114, during a compliance test, the National Highway Traffic Safety Administration (NHTSA) "will attempt to shift the transmission out of 'park' without depressing the vehicle's service brake for each ignition position. If the transmission can be shifted out of park without the brake pedal depressed, an apparent noncompliance will be deemed to have been found."

ICE and centralized electric axle driven vehicles address implementation of the transmission PARK state through a separate parking pawl mechanism that is engaged for preventing movement of the gears/shafts in a transmission. Initially, these mechanisms were cable/spring based, but more present vehicles control the PARK function in a transmission via some type of mechatronic actuation system. Mechatronic actuation systems often contain sensing elements to ensure the vehicle and operator truly know the state of the transmission.

SUMMARY OF THE INVENTION

A method for diagnosing a park function in a vehicle including a plurality of in-wheel motors each including first and second planetary gear sets includes, at a computing device, selectively engaging each of the first and second planetary gear sets in each of the plurality of in-wheel motors to place each of the in-wheel motors into a park state, engaging respective locking mechanisms of each of the in-wheel motors, when each of the first and second planetary gear sets is engaged and the respective locking mechanisms are engaged, determining whether a corresponding one of the in-wheel motors maintains the park state, and operating the vehicle in a selected one of a plurality of operating modes based on the determination of whether the corresponding one of the in-wheel motors maintained the park state.

In other features, the method further includes operating the vehicle in a first operating mode in response to a determination that each of the in-wheel motors maintained the park state, operating the vehicle in a second operating mode in response to a determination that at least one but not all of the in-wheel motors maintained the park state, and operating the vehicle in a third operating mode in response to a determination that none of the in-wheel motors maintained the park state. Determining whether the corresponding one of the in-wheel motors maintains the park state includes de-energizing at least one solenoid configured to, when energized, cause the first and second planetary gear sets to engage a clutch assembly. Determining whether the corresponding one of the in-wheel motors maintains the park state includes de-energizing two solenoids respectively configured to, when energized, cause the first and second planetary gear sets to engage the clutch assembly. The first and second planetary gear sets correspond to first and second drive gears, respectively.

In other features, the vehicle includes two of the in-wheel motors. The vehicle includes more than two of the in-wheel motors. The respective locking mechanisms each include a pin configured to selectively engage with a shift fork to prevent movement of the shift fork. The respective locking mechanisms include a single pin configured to selectively engage with one or more shift forks to prevent movement of the one or more shift forks.

A computing device is configured to execute instructions stored in memory that, when executed, cause the computing device to carry out steps for diagnosing a park function in a vehicle including a plurality of in-wheel motors each including first and second planetary gear sets. The steps include selectively engaging each of the first and second planetary gear sets in each of the plurality of in-wheel motors to place each of the in-wheel motors into a park state, engaging respective locking mechanisms of each of the in-wheel motors, when each of the first and second planetary gear sets is engaged and the respective locking mechanisms are engaged, determining whether a corresponding one of the in-wheel motors maintains the park state, and operating the vehicle in a selected one of a plurality of operating modes based on the determination of whether the corresponding one of the in-wheel motors maintained the park state.

In other features, the steps further include operating the vehicle in a first operating mode in response to a determination that each of the in-wheel motors maintained the park state, operating the vehicle in a second operating mode in response to a determination that at least one but not all of the in-wheel motors maintained the park state, operating the vehicle in a third operating mode in response to a determination that none of the in-wheel motors maintained the park state. Determining whether the corresponding one of the in-wheel motors maintains the park state includes de-energizing at least one engagement mechanism configured to, when energized, cause the first and second planetary gear sets to engage a clutch assembly. Determining whether the corresponding one of the in-wheel motors maintains the park state includes de-energizing two engagement mechanisms respectively configured to, when energized, cause the first and second planetary gear sets to engage the clutch assembly. The first and second planetary gear sets correspond to first and second drive gears, respectively.

In other features, the vehicle includes two of the in-wheel motors. The vehicle includes more than two of the in-wheel motors. The respective locking mechanisms each include a pin configured to selectively engage with a shift fork to prevent movement of the shift fork. The steps further include using data from sensors and historical vehicle operating data to update calibration data located in memory to dynamically adjust thresholds for determining whether the first and second planetary gear sets are engaged or disengaged over a lifetime of the vehicle. The steps further include using the updated calibration data for vehicle propulsion operations and for confirming an operational status of the park state.

Other advantages will be appreciated in view of the following more detailed description.

BRIEF DESCRIPTION OF THE DRAWINGS

The drawings described herein are for illustrative purposes only of selected aspects and not all possible implementations and are not intended to limit the scope of the present disclosure.

FIG. 2B shows a block diagram of an example computing device configured to implement functions of the systems and methods described herein;

FIG. 2C shows an example implementation of a planetary gear set;

FIG. 2D shows a portion of a shift fork of the planetary gear set shown in FIG. 2C.

DETAILED DESCRIPTION OF THE ENABLING EMBODIMENTS

Figures 1A, 1B:
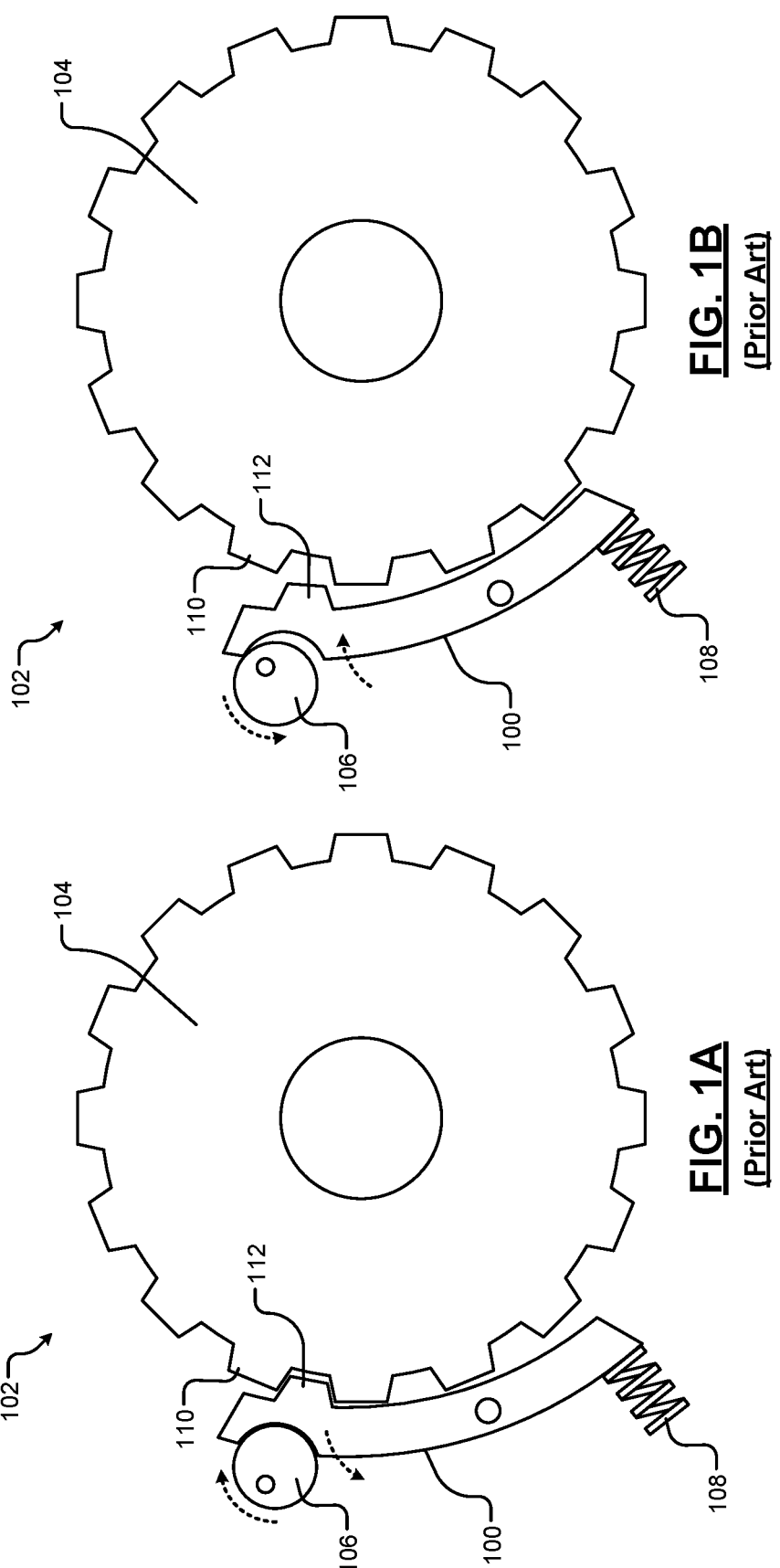
FIGS. 1A and 1B illustrate an example PARK function implementation using a parking pawl mechanism.

FIGS. 1A and 1B illustrate an example PARK function implementation using a parking pawl 100 located inside a transmission 102 (e.g., of an ICE vehicle). The parking pawl 100 is moved into (as shown in FIG. 1A) and out of (as shown in FIG. 1B) an engaging relationship with a dedicated parking gear 104. In some examples, a mechatronic device 106 rotates either clockwise or counterclockwise for this engagement and disengagement respectively. In other examples, the mechatronic device 106 may rotate in only one direction but is configured to determine whether it is in an engaged or disengaged position. When rotated clockwise with the gear in an engaged position as shown in FIG. 1A, the mechatronic device 106 disengages from the parking pawl 100 and allows a biasing element (e.g., a spring 108) to bias the parking pawl 100 away from the gear 104. Conversely, when rotated counterclockwise with the gear 104 in a disengaged position as shown in FIG. 1B, the mechatronic device 106 biases the parking pawl 100 toward the gear 104. Compliance testing may be performed by placing the vehicle in park on designated slopes to ensure that the parking pawl 100 does not disengage ("pop out") when the vehicle is facing uphill or downhill.

Typically, the parking pawl 100 and the parking gear 104 are configured such that the vehicle does not have to be 100% at rest to start the engagement process. For example, the parking pawl 100 may skip over teeth 110 of the parking gear 104 until the vehicle slows down to such an extent that the parking pawl 100 engages with the parking gear 104 (i.e., is disposed between adjacent teach 110) and there is not sufficient force to expel an engagement mechanism 112 of the parking pawl 100 from between the teeth 110. Attempts to engage the parking pawl 100 while the vehicle is moving may be quite loud. In some examples, additional electronic sensing capability may be added to the engagement mechanism 112 for diagnostic purposes (e.g., to determine possible damage to the parking pawl 100 or the teeth 110 on the parking gear 104).

The PARK function operation as described above in FIGS. 1A and 1B may not be viable or effective in some types of vehicles and motor-based propulsion configurations, and more attention is being directed towards alternative arrangements that provide improved environmental performance, eliminate mechanical driveline components, and result in a lighter-weight vehicle with more space for passengers and payload. For example, "on wheel", "in-wheel," or "near-wheel" motor configurations (all considered in-wheel or wheel-end electric motors in accordance with the present disclosure) are example alternative arrangements for ICE or centralized electric axle prime movers that distribute a prime mover function to each or some of the plurality of wheels via one or more electric propulsion systems disposed on, within, or proximate to the plurality of wheels. Specifically, when leveraging in-wheel motors (IWM) for an e-mobility solution, an electric vehicle may have two such motors in a rear-wheel or front-wheel drive configuration or four IWMs for an all-wheel drive configuration. Other configurations with a different number of IWMs is possible, the minimum being one IWM with no limit as to the maximum.

Systems and methods according to the present disclosure implement an integrated functional safety and diagnostic methodology for implementing the parking function/transmission PARK state in vehicles having an in-wheel motor/transmission configuration. For example, systems according to the present disclosure are configured to both confirm the state of health of the PARK function and provide a Soft Safe State (e.g., a state indicating that the electric vehicle still operational, but with limited functionality) and a Hard Safe State (e.g., indicating that the vehicle should not be operated) based on the state of health of the in-wheel motors. These functions cannot be implemented in the single parking pawl based architecture described above.

For example, an in-wheel motor according to the present disclosure has multiple gear states (e.g., Park, Reverse, Neutral, Drive, Drive 2 (D2), and Drive 1 (D1)) that are set by the engagement or disengagement of dog clutches controlled via two solenoids (S1/S2). In another embodiment, an alternative engagement mechanism, e.g., a magnetic coil, is used to control engagement/disengagement. An example of such an in-wheel electric motor is disclosed in Applicant's U.S. application Ser. No. 17/575,677 (issued as U.S. Pat. No. 11,590,840 on Feb. 28, 2023), the entire disclosure of which is incorporated herein by reference. When both solenoids (S1/S2) (or other actuator control mechanisms) are engaged, rotation of a planetary gear is locked, thus preventing individual wheel movement and establishing the PARK state, advantageously without the need for additional components to establish the PARK Function (e.g., a parking pawl, parking gear, cables, motors, springs, etc.).

The systems and methods of the present disclosure take advantage of the built-in redundancy associated with the parallel aspect of the IWM arrangement (i.e., dual IWMs, quad IWMs, etc.) in the electric vehicle to determine the Soft and Hard Safe States. For example, by leveraging IWM shuttering at vehicle startup, a parking mechanism state of health can be determined at each wheel end, thus enabling both Soft and Hard Safe States for the system as well as providing diagnostic information for the vehicle/operator. In a similar manner, based on sensor diagnostics, the state of health and the need for a Soft or Hard Safe State can be determined while the vehicle is in operation and prior to the operator bringing the vehicle to a halt and executing the PARK command. The information leveraged in this solution can be used for self-learning to adjust operation due to component wear over the life of the electric vehicle. Accordingly, systems and methods described herein enable safe operation, extend operations when a partial failure is detected, and implement self-learning functions to support dynamic calibration.

Example aspects of the diagnostic methodology and a corresponding algorithm with respect to the parking function for an IWM are described below in more detail. Each of the example embodiments are provided so that this disclosure is thorough and fully conveys the scope of the inventive concepts, features, and advantages to those skilled in the art. To this end, numerous specific details are set forth such as examples of specific components, devices, mechanisms, flow charts, or process steps associated with the algorithm and methodology to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure. Additionally, the methodology described in more detail below is applicable to both partial and full electric vehicles without departing from the scope of the subject disclosure.

Figure 2A:
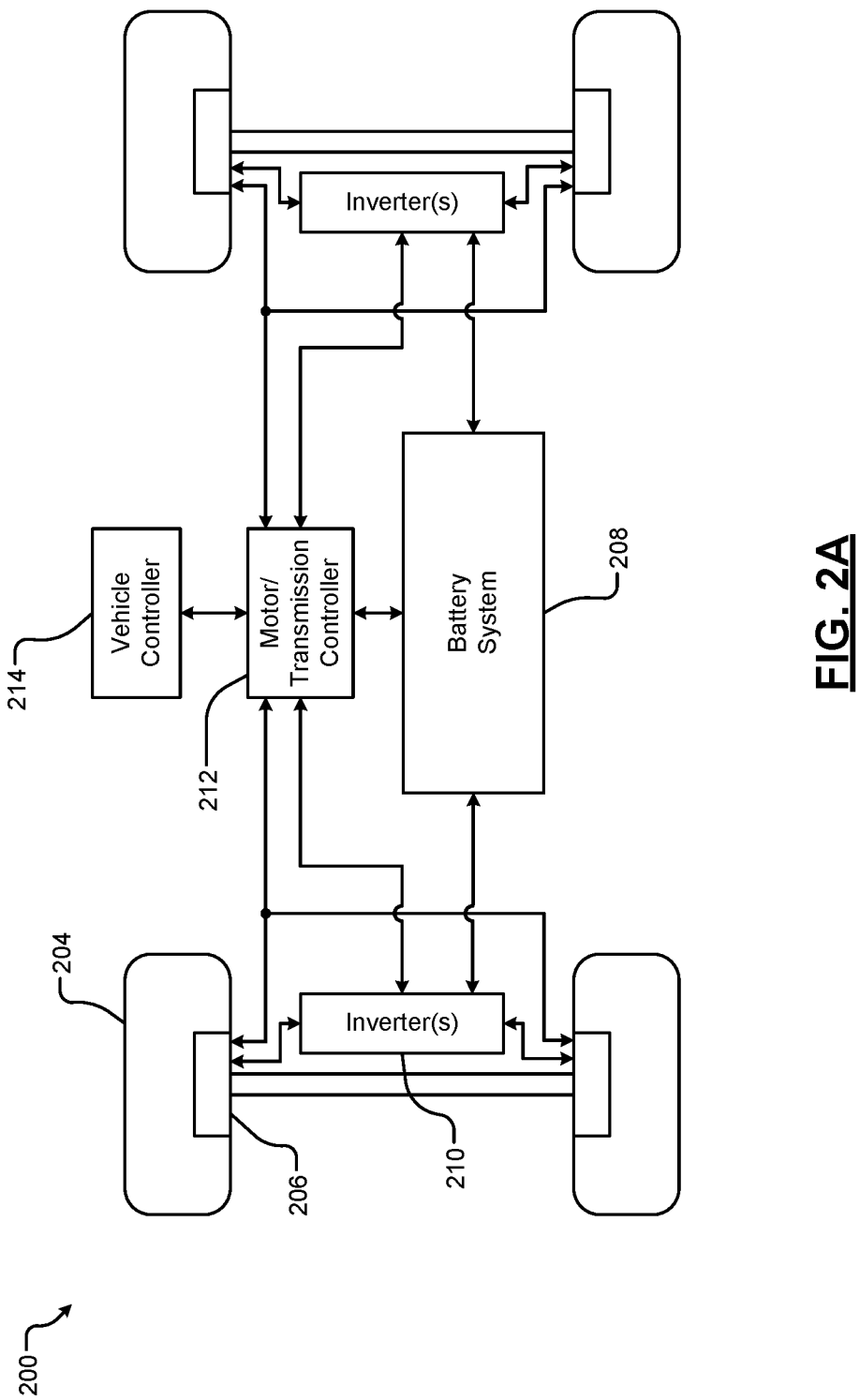
FIG. 2A shows a simplified example of an electric vehicle having an in-wheel motor with integrated transmission configuration.

FIG. 2A shows a simplified example of an electric vehicle 200 having an in-wheel motor configuration. In this example, each wheel 204 of the vehicle 200 includes a respective in-wheel motor 206 (i.e., quad IWMs). The motors 206 receive power from a battery system 208 (e.g., via one or more inverters 210 configured to convert direct current (DC) power to alternating current (AC) power for controlling the motors 206). A motor/transmission controller 212 controls supply of power from the battery system 208 to the in-wheel motors 206. For example, the motor/transmission controller 212 receives torque requests and/or other inputs from a driver and other vehicle systems (e.g., a cruise control system, an autonomous vehicle system, etc.) via a vehicle controller 214 and controls motor torque accordingly. One or more of the motor/transmission controller 212, the vehicle controller 214, and/or other controllers of the vehicle 200 may be configured to implement functions of the systems and methods of the present disclosure as described below in more detail.

FIG. 2B shows a block diagram of an example computing device 220 configured to (and/or including circuitry configured to) implement functions of the systems and methods described herein. For example, the computing device 220 may implement or be implemented by the motor/transmission controller 212, the vehicle controller 214, and/or other controllers of the vehicles, respectively or collectively. Systems described herein may implement a single computing device, a plurality of computing devices, etc. configured to individually and/or collectively perform functions related to the systems and methods of the present disclosure.

The computing device 220 may include control circuitry 224 that may be, for example, one or more processors or processing devices, a central processing unit processor (CPU), an integrated circuit or any suitable computing or computational device, an operating system 226, memory 228, executable code 230, input devices or circuitry 232, and output devices or circuitry 234. The control circuitry 224 (or one or more controllers or processors, possibly across multiple units or devices) may be configured to implement functions of the systems and methods described herein. More than one of the computing devices 220 may be included in, and one or more of the computing devices 220 may act as the components of, a system according to embodiments of the disclosure. Various components of the computing device 220 may be implemented with same or different circuitry, same or different processors or processing devices, etc.

The operating system 226 may be or may include any code segment (e.g., one similar to the executable code 230 described herein) designed and/or configured to perform tasks involving coordination, scheduling, arbitration, supervising, controlling or otherwise managing operation of the control circuitry 224, for example, scheduling execution of software programs or tasks or enabling software programs or other hardware modules or units to communicate. The operating system 226 may be a commercial operating system. It will be noted the operating system 226 may be an optional component (e.g., in some embodiments, a system may include a computing device that does not require or include the operating system 226). For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 228 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short-term memory unit, a long-term memory unit, or other suitable memory units or storage units. The memory 228 may be or may include a plurality of, possibly different memory units. The memory 228 may be a computer or processor non-transitory readable medium, or a computer non-transitory storage medium, e.g., RAM.

The executable code 230 may be any executable code, e.g., an application, a program, a process, task or script. The executable code 230 may be executed by the control circuitry 224, possibly under control of the operating system 226. Although, for the sake of clarity, a single item of the executable code 230 is shown, a system according to some embodiments of the disclosure may include a plurality of executable code segments similar to the executable code 230 that may be loaded into the memory 228 and cause the control circuitry 224 to carry out methods described herein. Where applicable, the terms "process" and "executable code" may be used interchangeably herein. For example, verification, validation and/or authentication of a process may mean verification, validation and/or authentication of executable code.

In some examples, the memory 228 may include non-volatile memory having the storage capacity of a storage system. In other examples, the computing device 220 may include or communicate with a storage system. Such a storage system may include, for example, flash memory as known in the art, memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in the storage system and loaded from the storage system into the memory 228 where it may be processed by the control circuitry 224.

The input circuitry 232 may be or may include any suitable input devices, components or systems, e.g., physical sensors such as accelerometers, thermometers, microphones, analog to digital converters, etc., a detachable keyboard or keypad, a mouse, etc. The output circuitry 234 may include one or more (possibly detachable) displays or monitors, motors, servo motors, speakers, high side driver, low side driver, and/or any other suitable output devices. Any applicable input/output (I/O) devices may be connected to the control circuitry 224. For example, a wired or wireless network interface card (NIC), a universal serial bus (USB) device, JTAG interface, or external hard drive may be included in the input circuitry 232 and/or the output circuitry 234. It will be recognized that any suitable number of input devices and output devices may be operatively connected to the control circuitry 224. For example, the input circuitry 232 and the output circuitry 234 may be used by a technician or engineer in order to connect to the control circuitry 224, update software, and the like.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 228, computer-executable instructions such as the executable code 230, and a controller such as the control circuitry 224.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the control circuitry 224), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the control circuitry 224.

An example implementation of a planetary gear set 240 (e.g., of one of the in-wheel motors 206) is shown schematically in FIG. 2C. The gear set 240 includes two planetary gear assemblies 242 and 244 configured to transfer rotational power/motion to an output shaft 246 (e.g., an output shaft coupled to the wheel 204). A clutch assembly 248 is configured to selectively cause one or both of the gear assemblies 242 and 244 to mechanically engage the output shaft 246 (e.g., responsive to commands from the motor/transmission controller 212 and/or the vehicle controller 214). In an embodiment, a first solenoid 252 is energized to cause the clutch assembly 248 (e.g., a first clutch of the clutch assembly 248) to mechanically engage with the gear assembly 242, which may correspond to a first drive gear (e.g., LOW). A second solenoid 254 is energized to cause the clutch assembly 248 (e.g., a second clutch of the clutch assembly 248) to mechanically engage with the gear assembly 244, which may correspond to a second drive gear (e.g., HIGH). When neither of the solenoid 252 and 254 is energized, neither of the gear assemblies 242 and 244 is engaged with the clutch assembly 248, which may correspond to a neutral gear. Although described herein as solenoids 252 and 254, other electrical, mechanical, or electro-mechanical engagement mechanisms may be implemented.

However, when both of the solenoids 252 and 254 are energized, both of the gear assemblies 242 and 244 are engaged with the clutch assembly 248, which corresponds to a park state. For example, as described in more detail in incorporated U.S. Pat. No. 11,590,840, causing both of the gear assemblies 242 and 244 to be engaged with respective clutches of the clutch assembly 248 at a same time locks the planetary gear set 240 into place and movement of the corresponding wheel 204 is prevented. In other words, systems and methods according to the present disclosure operate in accordance with a gear set 240 configured to achieve a park state without an additional gear or parking gear or parking pawl. Further, since each of the wheels 204 and corresponding motors 206 has the described configuration, any of the motors 206 individually can be controlled to achieve a park state. Accordingly, for the vehicle 200, if at least one of the IWMs 206 is fully functional, a same park function level found in systems using a parking pawl as described above in FIGS. 1A and 1B is achieved. However, when more than one of the IWMs 206 is fully functional, the park function of the vehicle 200 achieves a level of redundancy not found in systems using the parking pawl architecture described above. Consequently, when the vehicle 206 includes more than one of the IWMs 206 and at least one of the IWMs is fully functional but at least one of the IWMs 206 is not fully functional, then the park function may be considered operational but operating in a SOFT safe state mode.

In some examples, clutches of the clutch assembly 248 may be actuated by energizing the solenoids 252/254 to cause translational movement of a shifting mechanism, such as a piston, shift fork, etc. A portion of a shift fork 260 is shown in FIG. 2D. When a corresponding solenoid is energized, the shift fork 260 moves in a first direction (e.g., as indicated by arrow 262) to cause a corresponding clutch to engage with a gear assembly. Conversely, when the solenoid is not engaged, the shift fork 260 moves in a second direction (e.g., as indicated by arrow 264) to cause the clutch to disengage. For example, the shift fork 260, a corresponding piston, etc. is biased in the second direction using a spring or other mechanical biasing element. Accordingly, when the solenoid is not energized, a default position of the shift fork 260 corresponds to disengagement of the clutch assembly from the corresponding gear assembly.

The shift fork 260, the solenoids 252, 254, and/or another mechanical element according the present disclosure may be placed in a locked state to prevent disengagement. As one example, the shift fork 260 may include a slot 268. A pin 270 may be selectively actuated (e.g., responsive to the motor/transmission controller 212, the vehicle controller 214, etc.), causing the pin 270 to be inserted into the slot 268. The pin 270 prevents further movement of the shift fork 260 in the second direction 264. Accordingly, to place the vehicle 200 in park, the pin 270 may be actuated while the solenoids 252, 254 are energized as described above. When the solenoids 252, 254 are de-energized with the pin 270 inserted into the slot 268, movement of the shift fork 260 in the second direction 264 is prevented, causing the vehicle 200 to be retained in the gear state. When such a locking mechanism is engaged across the described planetary gear set 240 (e.g., both 242 and 244 are engaged), the IWM 206 enters the park state. Although described above with respect to locking the shift fork 260 into position using the pin 270, the principles of the present disclosure may be implemented with other locking mechanisms.

Figure 3:
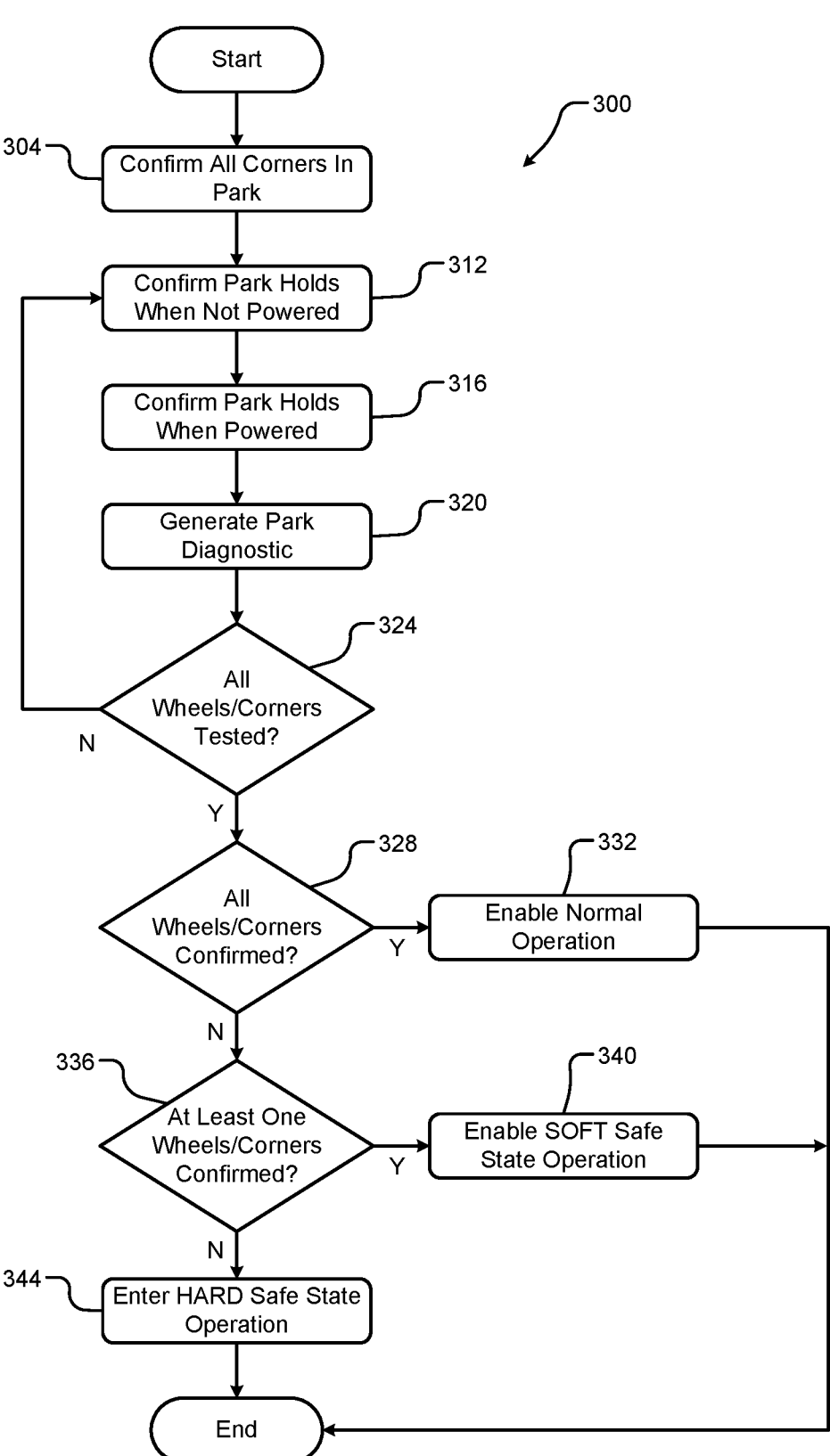
FIG. 3 illustrates steps of an example method for diagnosing a park function of each in-wheel motor of an electric vehicle according to the present disclosure.

FIG. 3 illustrates steps of an example method 300 for diagnosing a PARK function status of the vehicle along with the PARK function status of each in-wheel motor of an electric vehicle according to the present disclosure. For example the method 300 is performed by the motor/transmission controller 212, the vehicle controller 214, and/or other control circuitry (e.g., either individually or collectively. In accordance with an example aspect of the method 300 and corresponding algorithm, upon ignition of a stationary electric vehicle, the algorithm diagnoses the PARK function state of health at a vehicle level as well as at each corner. Results from each corner (i.e., in-wheel motor) are ultimately merged to determine if normal operation can continue or if the electric vehicle should be placed into a HARD or SOFT safe state. A HARD safe state would be entered when an error has been detected in the system that interferes with the PARK function (e.g., prevents all corners from retaining a park state). A HARD safe state can typically only be cleared by a certified repair facility. A SOFT safe state is entered when an error has been detected that can be mitigated to the point where the vehicle can be operated with at least partial functions (e.g., at least one IWM has an operational PARK function). This may mean the vehicle is operating at a reduced level of performance as such a state is indicative of at least one of the IWMs 206 has only partial transmission functionality. The vehicle may require service to resolve the issue. Although described with respect to a vehicle having four (i.e., one per each corner/wheel) in-wheel motors configured to enter a PARK state as described above, the principles of FIG. 3 may be applied to vehicles having fewer (e.g., only two) in-wheel motors.

The method 300 may include first checking whether a previous ignition cycle had detected a situation where a HARD safe state has not been cleared for an IWM. The operational state of each IWM during the prior drive cycle, including, but not limited to, the operator executing the PARK command, can be used to access the capability of each IWM to implement the PARK function, and consequently the need for a HARD safe state. Assuming there is not a HARD safe state, supervisor level software may query each corner (i.e., IWM) as to the state of its capability to lock the corner in the PARK state.

Upon receiving the request, each in-wheel motor confirms whether their respective locking mechanisms are functioning. Thus, the method confirms that the park function and the locking mechanism are functioning for each of the IWMs. It should be noted that in this embodiment, and as explained previously, when a vehicle is placed into park, both S1 and S2 are simultaneously energized causing the LOW and HIGH gears to engage which locks the planetary gear set to create the PARK state. While the subject embodiment is discussed in association with multiple lock mechanisms, the method could also be implemented with a single lock mechanism which locks multiple solenoids without departing from the scope of the subject disclosure. As the vehicle cannot stay energized, a solenoid "lock" mechanism can be activated to hold the gears in place without maintaining an energized state. Depending on the implementation, a "lock" may exist for each solenoid or a common one could be shared. To confirm the PARK function is valid in the non-energized state, not only must the solenoid locks be engaged, but position sensors must confirm the LOW and HIGH gears are in an ENGAGED state. If the solenoid lock mechanism is engaged and both LOW and HIGH gears are in the ENGAGED state, then the PARK function is deemed operational. If any of these elements are not true, it may be assumed that the corner exited the PARK state while not powered.

In one example implementation, at 304, the method 300 first confirms that all corners (i.e., in-wheel motors) are in a PARK state prior to performing the diagnostic. At 312, the method 300 confirms whether a selected corner holds the PARK state when not powered (i.e., when the solenoids are not energized, such as when the vehicle is not powered). For example, with the solenoids de-energized and the locking mechanism (e.g., the pin 270) actuated, the method 300 may monitor various sensor measurements and/or perform various functions. As one example, the method 300 receives measurement signals from a position sensor, a pressure sensor, etc. to verify whether the LOW and HIGH gears are engaged. For example, a position sensor associated with a respective gear may output a signal that is greater than or equal to a threshold when the gear is engaged and less than the threshold when the gear is not engaged.

At 316, the method 300 confirms whether the selected corner holds the PARK state when powered (i.e., when the solenoids are energized). The method 300 may confirm the corner is in the PARK state based on measurement signals as described above. In one embodiment, the solenoid locking mechanism does not need to be disengaged to test whether the solenoid control (252/254 in conjunction with 248) of the planetary gear set 240 supports the PARK function when the solenoids are powered. In one example, the method 300 may perform a motor rocking ("ROCKMOTOR") function to determine whether movement is possible while the corner is in the PARK state. The ROCKMOTOR function may correspond to a command to move the gear set forward and backward with a predefined force. For a planetary gear set, when the park function is operational, a known, fractionally small movement is expected given the tolerance of the gear set. Sensors (e.g., wheel and motor position sensors) are used to detect gear movement. If the LOW and HIGH gears are engaged, gear movement will be minimal (e.g., below a threshold) and fall within an expected range of movement. If gear movement is within the expected range, the PARK function is considered operational. If gear movement is not within the expected range, the solenoid locking mechanism may be assumed to be faulty.

At 320, the method 300 generates a park diagnostic for the selected corner. For example, the park diagnostic may include data indicating whether the corner held the PARK state when powered and not powered as described above in steps 312 and 316. For example, the data may include two or more bits of data. In one example, the data includes two bits having any of states 00, 01, 10, and 11, where a 0 indicates that the PARK state was not held and a 1 indicates that the PARK state was held (e.g., 00 indicates that the PARK state was not held when powered or not powered, 01 indicates that the PARK state was held while powered but not held when not powered, etc.).

At 324, the method 300 determines whether all corners where tested/diagnosed. If true, the method 300 continues to 328. If false, the method 300 continues to 312 to continue to diagnose additional corners. In one embodiment, if after repeated attempts of executing 324, not all corners have been confirmed to have been tested, the method 300 may force a HARD or SOFT safe state based solely on the information provided by the wheel ends that have reported their functionality state.

At 328, the method 300 determines whether all corners were confirmed to hold the PARK state both when powered and not powered. If true, the method 300 continues to 332. If false, the method 300 continues to 336. At 332, the method 300 enables normal operation. In other words, since all corners of the vehicle held the PARK state when powered and not powered, the method 300 determines that there are no parking faults and therefore no limitations on operation of the vehicle.

At 336, the method 300 determines whether at least one corner of the vehicle was confirmed to hold the PARK state when powered and not powered. If true, the method 300 continues to 340. If false, the method 300 continues to 344. At 340, the method 300 enables a SOFT safe state operation. For example, in the SOFT safe state, at least one in-wheel motor maintains the PARK function and therefore the vehicle may be operated with limited functionality. Limited functionality is defined, but not limited to, the ability to enter the PARK gear state and to have at least one IWM with the capability to provide propulsion in at least one drive gear state.

At 344, the method 300 enters HARD safe state operation as described above. In other words, since none of the in-wheel motors are able to perform the PARK function as described above, operation of the vehicle may be prevented. In one embodiment, the HARD safe state may drive other operations (e.g., operator warning notification, OEM warning notification, activating hazard lights, etc.).

As is highlighted by the differences in SOFT/HARD Safe States described above, the in-wheel motor EV architecture can be designed to have redundant functionality that can maintain operation for the operator even when more than one fault might exist in the vehicle PARK function. This functionality is applicable to any drive configuration as long as the configuration includes at least two IWMs with the implied planetary gear set and associated control mechanisms. Additionally, as the functionality is achieved via the mechanical structure of the gear box, no additional mechanical elements are needed to meet FMVSS 114 requirements (e.g., parking pawl, parking gear, etc.), yielding potential cost savings and mass advantage over traditional solutions. Furthermore, the given method can be leveraged to support automated calibration adjustments over the life of the application. Finally, this same method can be leveraged for further functional safety aspects as it identifies potential problems with the gearbox prior to the driver engaging in the drive function.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrases "at least one of A, B, and C" and "at least one of A, B, or C" should be construed to mean a logical (A OR B OR C), using a non-exclusive logical OR, and should not be construed to mean "at least one of A, at least one of B, and at least one of C."

The terms "a," "an," "the," and "said" as used herein in connection with any type of processing component configured to perform various functions may refer to one processing component configured to perform each and every function, or a plurality of processing components collectively configured to perform each of the various functions. By way of example, "A processor" configured to perform actions A, B, and C may refer to one or more processors configured to perform actions A, B, and C. In addition, "A processor" configured to perform actions A, B, and C may also refer to a first processor configured to perform actions A and B, and a second processor configured to perform action C. Further, "A processor" configured to perform actions A, B, and C may also refer to a first processor configured to perform action A, a second processor configured to perform action B, and a third processor configured to perform action C.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method for diagnosing a park function in a vehicle including a plurality of in-wheel motors each including first and second planetary gear sets, the method comprising, at a computing device:

selectively engaging both of the first and second planetary gear sets in each of the plurality of in-wheel motors to place each of the in-wheel motors into a park state;

engaging respective locking mechanisms of each of the in-wheel motors to lock each of the respective first and second gear sets in the engaged condition;

upon ignition of the vehicle, determining whether a corresponding one of the in-wheel motors maintains the park state by performing a motor rocking function on the corresponding in-wheel motor to move the engaged first and second planetary gear sets forward and backward with a predefined force and determine whether the resultant forward and backward movement of the engaged first and second planetary gear sets is less than or greater than a predetermined threshold; and operating the vehicle in a selected one of a plurality of operating modes based on the determination of whether the corresponding one of the in-wheel motors maintained the park state.

2. The method of claim 1, further comprising:

operating the vehicle in a first operating mode in response to a determination that during the motor rocking function each of first and second planetary gear sets of the in-wheel motors had movement being less than the predetermined threshold and thus maintained the park state;

operating the vehicle in a second operating mode in response to a determination that during the motor rocking function at least one set of first and second planetary gear sets but not all of the sets of first and second planetary gear sets of the in-wheel motors had movement being less than the predetermined threshold and thus at least one in-wheel motor maintained the park state; and operating the vehicle in a third operating mode in response to a determination that during the motor rocking function all of the first and second planetary gears sets of the in-wheel motors had movement being greater than the predetermined threshold and thus none of the in-wheel motors maintained the park state.

3. The method of claim 1, wherein determining whether the corresponding one of the in-wheel motors maintains the park state includes de-energizing at least one solenoid configured to, when energized, cause the first and second planetary gear sets to engage a clutch assembly.

4. The method of claim 3, wherein determining whether the corresponding one of the in-wheel motors maintains the park state includes de-energizing two solenoids respectively configured to, when energized, cause the first and second planetary gear sets to engage the clutch assembly.

5. The method of claim 4, wherein the first and second planetary gear sets correspond to first and second drive gears, respectively.

6. The method of claim 1, wherein the vehicle includes two of the in-wheel motors.

7. The method of claim 1, wherein the vehicle includes four in-wheel motors.

8. The method of claim 1, wherein the respective locking mechanisms each include a pin configured to selectively engage with a shift fork to prevent movement of the shift fork.

9. The method of claim 1, wherein the respective locking mechanisms include a single pin configured to selectively engage with one or more shift forks to prevent movement of the one or more shift forks.

10. A computing device configured to execute instructions stored in memory that, when executed, cause the computing device to carry out steps for diagnosing a park function in a vehicle including a plurality of in-wheel motors each including first and second planetary gear sets, the steps including:

selectively engaging both of the first and second planetary gear sets in each of the plurality of in-wheel motors to place each of the in-wheel motors into a park state;

engaging respective locking mechanisms of each of the in-wheel motors to lock each of the respective first and second gear sets in the engaged condition;

upon ignition of the vehicle, determining whether a corresponding one of the in-wheel motors maintains the park state by performing a motor rocking function on the corresponding in-wheel motor to move the engaged first and second planetary gear sets forward and backward with a predefined force and determine whether the resultant forward and backward movement of the engaged first and second planetary gear sets is less than or greater than a predetermined threshold; and operating the vehicle in a selected one of a plurality of operating modes based on the determination of whether the corresponding one of the in-wheel motors maintained the park state.

11. The computing device of claim 10, the steps further comprising:

operating the vehicle in a first operating mode in response to a determination that during the motor rocking function each of the first and second planetary gears sets of the in-wheel motors had movement being less than the predetermined threshold and thus maintained the park state;

operating the vehicle in a second operating mode in response to a determination that during the motor rocking function at least one set of first and second planetary gear sets but not all of the sets of first and second planetary gear sets of the in-wheel motors had movement being less than the predetermined threshold and thus at least one in-wheel motor maintained the park state; and operating the vehicle in a third operating mode in response to a determination that during the motor rocking function all of the first and second planetary gear sets of the in-wheel motors had movement being greater than the predetermined threshold and thus none of the in-wheel motors maintained the park state.

12. The computing device of claim 10, wherein determining whether the corresponding one of the in-wheel motors maintains the park state includes de-energizing at least one engagement mechanism configured to, when energized, cause the first and second planetary gear sets to engage a clutch assembly.

13. The computing device of claim 12, wherein determining whether the corresponding one of the in-wheel motors maintains the park state includes de-energizing two engagement mechanisms respectively configured to, when energized, cause the first and second planetary gear sets to engage the clutch assembly.

14. The computing device of claim 13, wherein the first and second planetary gear sets correspond to first and second drive gears, respectively.

15. The computing device of claim 10, wherein the vehicle includes two of the in-wheel motors.

16. The computing device of claim 10, wherein the vehicle includes four in-wheel motors.

17. The computing device of claim 10, wherein the respective locking mechanisms each include a pin configured to selectively engage with a shift fork to prevent movement of the shift fork.

18. The computing device of claim 10, the steps further comprising using data from sensors and historical vehicle operating data to update calibration data located in memory to dynamically adjust thresholds for determining whether the first and second planetary gear sets are engaged or disengaged over a lifetime of the vehicle.

19. The computing device of claim 18, the steps further comprising using the updated calibration data for vehicle propulsion operations and for confirming an operational status of the park state.

* * * * *